Feb. 14, 1956　　　　F. S. MALICK　　　　2,735,060
MAGNETIC AMPLIFIER MOTOR SPEED CONTROL
Filed Aug. 16, 1952

WITNESSES:
John E. Healy
Wm. B. Sellers

INVENTOR
Franklin S. Malick
BY
Paul E. Friedemann
ATTORNEY

United States Patent Office 2,735,060
Patented Feb. 14, 1956

2,735,060
MAGNETIC AMPLIFIER MOTOR SPEED CONTROL

Franklin S. Malick, Annapolis, Md., assignor to Westinghouse Electric Corporation, East Pittsburgh, Pa., a corporation of Pennsylvania Application August 16, 1952, Serial No. 304,709

6 Claims. (Cl. 318—331)

My invention relates to motor control systems and more particularly to systems of control for varying the speeds of direct current motors.

In many situations in industry it is desirable to control the operation of a direct current motor from a source of alternating current. In prior practice electronic devices have been in use for the mentioned purpose. Electronic devices require a warm-up period and a standby source of power for the heating filaments, involve considerable maintenance cost, have a low overload capacity, low starting torque, and other disadvantages.

One broad object of my invention is the provision of a speed control for a direct current motor, energized from a source of alternating current, that requires no warm-up period, involves low maintenance costs, has relatively high overload capacity, and provides for a relatively high motor starting torque.

Another broad object of my invention is the provision of a speed control for a direct current motor, energized from a source of alternating current, wherein the control functions are accomplished by magnetic amplifiers.

Figure 1:
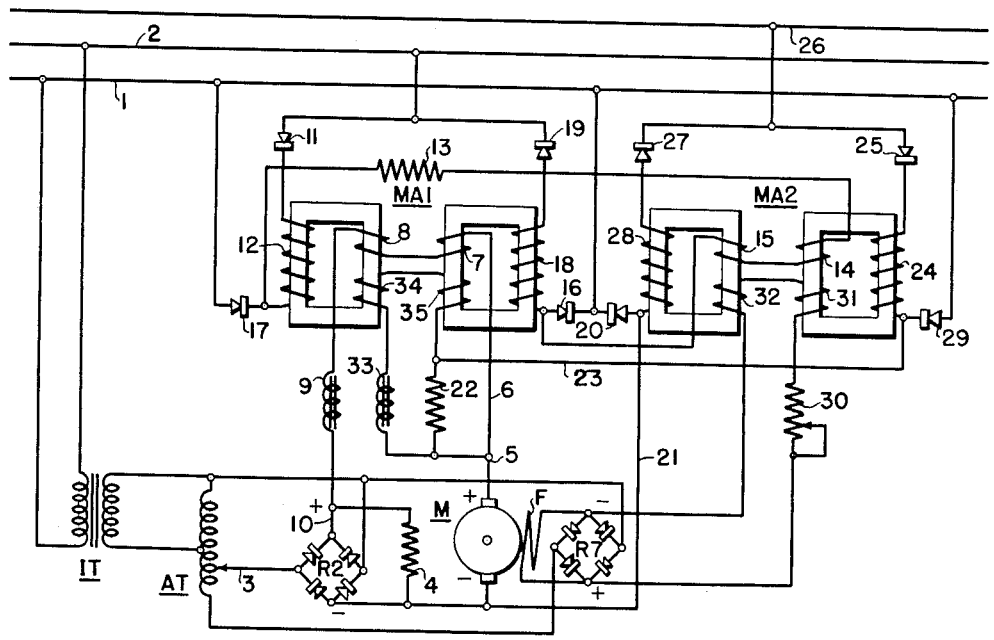
Figure 2:
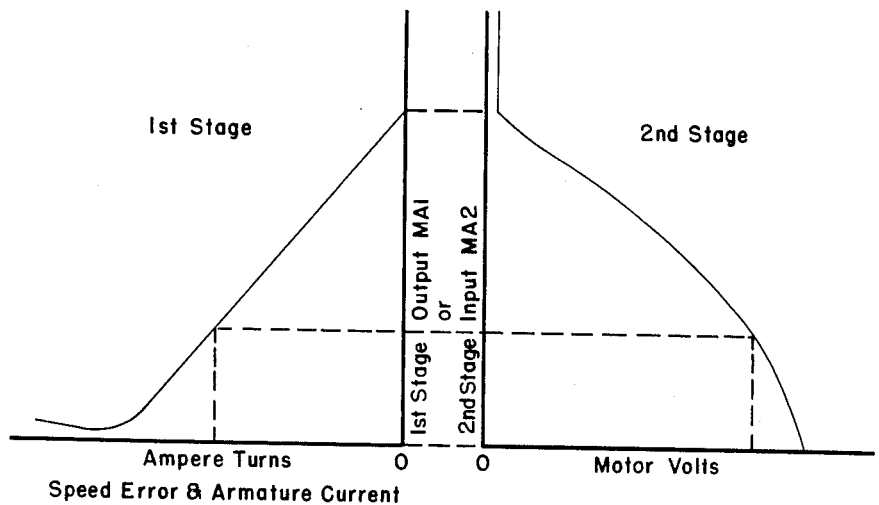

The objects recited are merely illustrative. Other objects and advantages will become more apparent from a study of the following specification, and the accompanying drawing, in which:

Figure 1 is a diagrammatic showing of one circuit arrangement of my invention; and Fig. 2 shows some curves illustrating some of the operating characteristics of my system of control.

In Fig. 1, M represents the direct current motor to be controlled. The first stage magnetic amplifier MA1, the second stage magnetic amplifier MA2 and other elements shown comprise the control system for the motor.

The motor field F is connected directly across the direct current junctions of the rectifier R7. The alternating current junctions of this rectifier are connected directly to the outer constant potential terminals of the autotransformer AT. The field winding F is thus energized at a constant value. The autotransformer AT is as shown supplied from the secondary of the isolating transformer IT. The primary of the isolating transformer IT is connected directly across the leads 1 and 2 of the three wire single phase supply of alternating current.

A rectifier R2 has its alternating current junctions connected across a selected portion of the autotransformer AT. In fact by shifting the adjustable lead 3 the voltage appearing across resistor 4 may be made to correspond to the voltage tapped off by the lead 3. This direct current reference voltage across resistor 4 is thus proportional to the desired speed, lead 3 being thus considered as the means for manually, or automatically, controlling the motor speed. How this comes about will become clear as the description proceeds.

If the motor voltage is as indicated by the plus and minus signs then it will be apparent that this motor voltage energizes a circuit from the upper motor terminal 5 through lead 6 control windings 7 and 8 of the first stage magnetic amplifier MA1, the filtering reactor 9 and resistor 4, the motor armature back to the positive terminal 5. The rectifier R2, on the other hand, provides an energizing circuit from its positive terminal 10, through filtering reactor 9, control windings 8 and 7, conductor 6, positive terminal 5, the motor armature, the negative terminal of the rectifier, through the rectifier R2 to the positive terminal.

From the two circuits traced it is apparent that the motor voltage, which is approximately proportional to motor speed, is compared to the reference voltage, and that the difference of these two voltages causes a speed error current to flow through the control windings of the first stage of the self-saturating type of magnetic amplifier MA1.

The main circuits for one half wave for the first stage amplifier MA1 may be traced from conductor 2 through rectifier 11, main winding 12, load limiting resistor 13, control windings 14 and 15 of the second stage self-saturating type of magnetic amplifier MA2 and rectifier 16 to the lead 1. For the second half wave the circuit may be traced from lead 1 through rectifier 17, resistor 13, control windings 14 and 15, main windings 18 and rectifier 19 to lead 2. It will be noted that the output of the first stage amplifier MA1 is fed through the control windings of the second stage amplifier MA2.

The second stage amplifier provides the power for the motor armature. The power circuits may be traced, for one half wave, from lead 1 through rectifier 29, conductor 23, resistor 22, the motor armature, conductor 21, main winding 28 and rectifier 27 to lead 26. For the second half wave the energizing circuit extends from lead 26 through the rectifier 25, main winding 24, conductor 23, resistor 22, the motor armature, conductor 21, and rectifier 20 to lead 1. The second stage amplifier is also provided with bias windings. The circuit for these bias windings extends from the positive junction of rectifier R7 through the adjustable resistor 30, bias windings 31 and 32 to the negative junction of the rectifier R7.

The resistor 22, being in series with the motor armature thus generates a voltage proportional to the armature current. By connecting the filtering reactor coil 33 and the control coils 34 and 35 across resistor 22, a signal current is caused to flow in the control coils 34 and 35 in such a direction as to increase the speed of the motor, thus overcoming the armature IR drop. That is, my control provides for IR compensation.

If the voltage at terminal 5 should become less than at terminal 10, current will flow from terminal 10 through the reactor 9, control coils 8 and 7, and conductor 6 to terminal 5. This will cause the first stage ampere turns to increase to the left (see Fig. 2), reducing the first stage output. Reducing the output of the first stage amplifier causes the second stage to increase the voltage applied to the armature, thereby reducing the motor speed error and reducing the speed error current.

Since there is no bias on the first stage amplifier, it puts out about half of its maximum output when the speed error and armature current ampere turns are zero. This is the maximum value of output which the first stage can reach because current cannot reverse direction in either of the first stage amplifier control windings. The maximum value of output on the first stage causes the second stage amplification to be a minimum so that the motor will not run.

The second stage amplifier has its bias so adjusted that minimum output from the first stage amplifier will cause full voltage to be applied to the motor armature.

The motor armature voltage is determined by the relation $E_a = E_i + IR$, where $E_i$ is the induced voltage which is proportional to speed. Since the voltage $E_a$ is balanced against the reference voltage and not $E_i$, the speed will change as the armature current $I$ changes with changes in load. The speed error is thus normally too small by the amount of IR. This IR component of the speed error is added in the first stage amplifier by feeding in a control current which is proportional to the motor armature current.

From the foregoing it will be apparent that I provide for accurate speed control of a direct current motor, namely a control for obtaining a constant motor speed at any selected speed as determined by the position of lead 3 on the autotransformer AT.

While I have shown and described but one circuit arrangement it is to be understood that my invention is capable of various adaptations and that changes and modifications may be made or substitutions resorted to which come within the spirit of my invention.

I claim as my invention:

1. In an electric system of control for a direct-current motor, in combination, a direct-current motor having an armature winding and a field winding energized with direct current of a selected magnitude, a pair of supply terminals energized with alternating current, a magnetic amplifier of the self-saturating type, having main windings and series connected rectifying means for each main winding, connected to said supply terminals and said armature winding to thus energize the motor armature winding as a function of the output of the magnetic amplifier, output control means for said magnetic amplifier, said output control means including control windings for the first-named magnetic amplifier, a control magnetic amplifier of the self-saturating type, having main windings and series connected rectifying means for each main winding, connected to said supply terminals and said control windings, a plurality of control windings for the control magnetic amplifier, one of said control windings being connected to be energized at a selected constant value in one sense and being connected to the motor armature to be energized in an opposite sense as a function of the motor armature voltage, whereby the control windings of the control amplifier are effectively energized in accordance with the motor speed error, namely the difference between the voltages applied to control windings of the control amplifier, and a second control winding for the control amplifier connected to the motor armature winding to provide a control current in accordance with the motor armature current to thus provide for IR compensation.

2. In an electric system of control for an electric motor, in combination, a direct-current motor having an armature winding and having a field winding excited at a selected value, a pair of supply terminals energized with alternating current, an autotransformer provided with a relatively large number of taps, an isolating transformer having its primary winding connected to said supply terminals and its secondary winding connected to the autotransformer, a full-wave rectifier having its alternating-current junctions connected across any pair of taps of the autotransformer to thus produce a voltage of any selected value at the direct-current junctions of the full-wave rectifier, a magnetic amplifier having a control winding interconnected with the motor armature winding and the direct-current junctions of the full-wave rectifier adapted to produce a control effect that is a function of the voltage difference between the voltage at the motor armature terminals and the direct-current voltage at the direct-current junctions of the full-wave rectifier, said magnetic amplifier having main windings and rectifying means interconnected therewith and connected to said supply terminals to thus produce a pulsating direct-current output, means interconnected with the motor armature winding for producing a voltage proportional to the IR drop of the armature winding, a second control winding for the magnetic amplifier interconnected with said means, and magnetic amplifier means for controlling the voltage supplied to the armature winding of the motor as a function of the output of the main windings of the magnetic amplifier.

3. In an electric system of control for an electric motor, in combination, a direct-current motor having an armature winding and having a field winding excited at a selected value, a pair of supply terminals energized with alternating current, an autotransformer provided with a relatively large number of taps, an isolating transformer having its primary winding connected to said supply terminals and its secondary winding connected to the autotransformer, a full-wave rectifier having its alternating-current junctions connected across any pair of taps of the autotransformer to thus produce a voltage of any selected value at the direct-current junctions of the full-wave rectifier, a magnetic amplifier having a control winding interconnected with the motor armature winding and the direct-current junctions of the full-wave rectifier adapted to produce a control effect that is a function of the voltage difference between the voltage at the motor armature terminals and the direct-current voltage at the direct-current junctions of the full-wave rectifier, said magnetic amplifier having main windings and rectifying means interconnected therewith and connected to said supply terminals to thus produce a pulsating direct-current output, a second magnetic amplifier having main windings and rectifying means connected in loop circuits with the motor armature winding, and control windings for the second magnetic amplifier interconnected with the main windings of the first magnetic amplifier, whereby the voltage supplied to the motor armature is a function of the motor speed.

4. In an electric system of control for an electric motor, in combination, a direct-current motor having an armature winding and having a field winding excited at a selected value, a pair of supply terminals energized with alternating current, an autotransformer provided with a relatively large number of taps, an isolating transformer having its primary winding connected to said supply terminals and its secondary winding connected to the autotransformer, a full-wave rectifier having its alternating-current junctions connected across any pair of taps of the autotransformer to thus produce a voltage of any selected value at the direct-current junctions of the full-wave rectifier, a magnetic amplifier having a control winding interconnected with the motor armature winding and the direct-current junctions of the full-wave rectifier adapted to produce a control effect that is a function of the voltage difference between the voltage at the motor armature terminals and the direct-current voltage at the direct-current junctions of the full-wave rectifier, said magnetic amplifier having main windings and rectifying means interconnected therewith and connected to said supply terminals to thus produce a pulsating direct-current output, means for producing a voltage substantially proportional to the IR drop in the motor armature circuit, a second control winding for the magnetic amplifier interconnected with said means, a second magnetic amplifier having main windings and rectifying means connected in loop circuits with the motor armature winding, and control windings for the second magnetic amplifier interconnected with the main windings of the first magnetic amplifier, whereby the voltage supplied to the motor armature is a function of the motor speed.

5. An electric system of control utilizing magnetic amplifier means for controlling the operation of a direct-current motor, in combination, a direct-current motor having armature windings and field windings, a magnetic amplifier having main windings and control windings, supply terminals energized with alternating current, means, including the said main windings, rectifier means, and said supply terminals, for supplying direct current to the motor armature winding from the supply terminals, a second magnetic amplifier having main windings and control winding, second means, including the main windings of the second magnetic amplifier, second rectifier means, said supply terminals, and the control windings of the first magnetic amplifier, for supplying controlled direct current to the control windings of the first magnetic amplifier, circuit means, including a circuit responsive to the motor armature voltage, terminals energized by a reference voltage, and the control windings of the second magnetic amplifier, for supplying a current to the control windings of the second magnetic amplifier that is a function of the voltage difference between the reference voltage and the armature terminal voltage of the motor, and second control windings on the second magnetic amplifier connected to be energized in accordance with the motor armature current.

6. In an electric system of control for a direct current motor, in combination, a direct current motor having an armature winding and a field winding, a pair of supply terminals energized with alternating current of a selected voltage, a full-wave rectifier having its alternating current junctions connected to said supply terminals, said motor field winding being connected to the direct current junctions of said full-wave rectifier to thus be energized at a selected constant voltage, an autotransformer connected to said supply terminals, said autotransformer having a plurality of voltage taps, a second full-wave rectifier having its alternating current junctions connected across any selected pair of taps of the autotransformer, a magnetic amplifier of the self-saturating type having two main windings, bias windings, control windings, and two rectifying means connected in series respectively with each of said two main windings, said two main windings being interconnected with the motor armature winding, circuit means interconnecting the main windings, and the rectifying means connected in series with the respective main windings, with said supply terminals, a pair of control terminals connected to be energized from the motor armature winding terminals and connected across the direct current junctions of the second full-wave rectifier to thus be also energized by a selected reference voltage, second circuit means interconnecting said magnetic amplifier control windings with said control terminals to thus energize said control windings as a function of said reference voltage and the voltage at the armature winding terminals of the motor, and circuit connections for connecting the bias windings to the direct current junctions of said first-named full-wave rectifier.

References Cited in the file of this patent

UNITED STATES PATENTS

| | | |
|---|---|---|
| 1,730,254 | Thomas | Oct. 1, 1929 |
| 2,554,203 | Morgan | May 22, 1951 |
| 2,555,992 | Ogle | June 5, 1951 |
| 2,558,086 | Herchenroeder | June 26, 1951 |
| 2,558,094 | King | June 26, 1951 |

OTHER REFERENCES

Publication—The Westinghouse Engineer, vol. 10, issue 5, article entitled "Magnetic Amplifiers in Industry," pp. 201–205.